United States Patent [19]

Wu et al.

[11] Patent Number: 5,103,670

[45] Date of Patent: Apr. 14, 1992

[54] TIRE VALVE AND PRESSURE GAUGE

[76] Inventors: Min-Yu Wu; Andrew H. Wu, both of 112 Brandybuck Way, San Jose, Calif.

[21] Appl. No.: 553,183

[22] Filed: Jul. 13, 1990

[51] Int. Cl.$^5$ .......................... B60C 23/02; G01L 7/06
[52] U.S. Cl. ..................................... 73/146.8; 73/729; 116/34 R
[58] Field of Search .................... 73/146.8, 146.3, 729; 116/34 R

[56] References Cited

U.S. PATENT DOCUMENTS

| | | | |
|---|---|---|---|
| 1,128,327 | 2/1915 | Keith | 73/146.8 |
| 4,103,549 | 8/1978 | Schmidt | 73/146.8 |
| 4,793,177 | 12/1988 | Wu et al. | 73/146.8 |

Primary Examiner—Donald O. Woodiel
Attorney, Agent, or Firm—Rosenblum, Parish & Bacigalupi

[57] ABSTRACT

The combination tire valve and pressure gauge of the present invention is formed to be substantially the same size as current tire valve stems, such that it may be used as a replacement part therefore. The device includes a pressure sensitive bellows disposed within the stem, the movement of which is counteracted by a calibrated spring. Movements of the bellows, caused by changes in the tire pressure, are mechanically translated to a rotary motion of a pressure indicator. A window is formed in the tire stem to permit viewing of the pressure indicator, whereby different numerals corresponding to different tire pressures become visible in the window upon rotation of the indicator which is caused by movement of the bellows. An air channel is formed through the device to permit air to be pumped into the tire. A rotary indicator having an internal spiral groove rotates upon a driving rod formed with projecting driving pin members that project into the spiral groove to cause the rotation of the indicator.

6 Claims, 3 Drawing Sheets

TIRE VALVE AND PRESSURE GAUGE

BACKGROUND OF THE INVENTION

1. Field of the Invention

The present invention relates to air pressure valves and gauges and more particularly to a tire valve having a pressure gauge combined therewithin, and to a pencil type pressure gauge with a rotary dial.

2. Brief Description of the Prior Art

Standard tire valve stems are designed simply to house a valve to regulate the flow of air into and out of tires. In order to measure the pneumatic pressure within a tire, a separate tire gauge must be used, and this involves much time and inconvenience. Without properly inflated tires, a motor vehicle's handling and braking ability is greatly reduced, while the rate of gasoline consumption and tire wear is increased.

A tire valve stem with a built-in pressure indicator eliminates the need to carry a separate tire gauge to measure the pneumatic pressure of a tire. Reading the air pressure of a tire can be accomplished at a glance. There is no need to unfasten a valve cap, or to insert a tire gauge into the nozzle. The present design configuration is arranged in a manner which will allow for the constant monitoring of pneumatic tire pressure. It is intended to aid in the promotion of traffic and air safety while reducing the rate of unnecessary gasoline consumption and tire wear.

Present pencil type tire pressure gauges are comprised of an indicating bar with a measurement scale, a spring and a piston housed in a tube. Without a properly sealed piston, the pressure reading of the gauge will be inaccurate. Additionally, a new reading must be taken whenever the gauge is removed from the tire valve stem.

A pencil type tire gauge with a rotary dial indicator having numerals disposed can provide an easy to read pressure display. Additionally, using a sealed bellows provides an accurate pressure reading. Finally, the push button type control valve with the valve core engaged at the lower end of the gauge allows the pressure reading to remain on the rotary dial indicator after the gauge is removed from the tire valve stem.

U.S. Pat. No. 4,793,177, issued Dec. 27, 1988 to the present inventors describes a combination tire valve and pressure gauge which utilizes an air pressure sensitive bellows. Movements of the bellows are mechanically translated to a rotating air pressure indicator by means of a push rod. A mating pair of gears, one of which is disposed on the push rod, and the other of which is disposed within the indicator, serve to convert the linear movement of the push rod into rotational movement of the indicator. The present invention includes a simpler, more efficient device.

The practical incorporation of an air pressure gauge within a tire valve stem has long been attempted. Prior art patents such as U.S. Pat. No. 2,190,530, Tire Gauge, issued Feb. 13, 1940 to W. S. Clarkson; U.S. Pat. No. 1,400,848, Pressure Gage, issued Dec. 20, 1921 to T. W. Anderson; U.S. Pat. No. 1,606,740, Tire Stem Pressure Gauge, issued Nov. 16, 1926 to A. Badowski; and U.S. Pat. No. 3,246,679, Combination Valve and Pressure Gauge, issued April 19, 1966 to E. J. Stealy, exemplify significant prior art.

Clarkson teaches a tire gauge that is designed for mounting upon a tire valve stem in which the tire valve core has been removed. The device includes a cylindrical housing having a bellows and an opposing spring disposed therewithin. A rotary dial is mounted upon a shaft having a spiral groove on its external surface. A pin whose vertical movement is actuated by the bellows is slidably mounted in the spiral groove, such that vertical movement of the bellows and pin will cause rotation of the dial through the interaction of the pin in the spiral groove.

Anderson teaches a pressure gauge incorporation within a valve stem (see FIG. 2), having an elastic diaphragm G which, per column 1, line 52, may include other pressure responsive means. The diaphragm is restrained by a calibrated spring K, and a rod L extends through a hole in a support head W to terminate in a rack N. The rack N meshes with a pinion O residing on a shaft P which also holds a beveled gear Q which meshes with a beveled gear R disposed on a rotatable shaft S. The rotatable shaft S contains a rotary pressure indicator M having numerals disposed thereon which are viewed through a window T. An air channel C is disposed in the wall of the tire stem to transmit air from the check valve B to the tire. It is therefore to be appreciated that Anderson teaches a relevant but complicated mechanism.

Badowski, U.S. Pat. No. 1,606,740, teaches a tire stem pressure gauge device which includes a bellows-type extensible member 17 which expands in its length within the tire stem depending upon the tire pressure. The bellows 17 is apparently engaged to a vertically-extending pressure indicator 14 which displays tire pressure as a direct function of the extension of the bellows-type member 17. The Badowski device is designed to accommodate tire stems differing in design from those currently available, and it is not readily apparent how this design could be accommodated within tire stems currently available.

Stealy, U.S. Pat. No. 3,246,679, teaches a combination valve and pressure gauge which is incorporated within the conically-shaped tire valve stem designs currently utilized. In Stealy, a pressure-sensitive elastic chamber 62 communicates through bore 60 with the inner tire air pressure. The chamber 62 expands against a calibrated spring 64 and a rod 54 projects through the upward portions of the tire stem and terminates in an indicator 55. Thus, the longitudinal extension of the elastic chamber 62 is directly reflected in the longitudinal extension of the indicator 55. Tire pressure markings are disposed upon a clear tire valve cap 15 to correlate with the outward extension of the indicator 55. Thus, a drawback to the Stealy device is that the tire cap 15 must be fully screwed onto the tire valve nozzle in order to determine the pressure within the tire. A user, upon inflating the tire, might have to screw the cap onto the nozzle several times to achieve the desired pressure.

Other patents of interest are U.S. Pat. No. 1,411,917, Tire Alarm and Gauge, issued April 4, 1922 to W. A. Harris; U.S. Pat. No. 1,136,901, Safety Valve Mechanism For Pneumatic Tires, issued April 20, 1915 to W. M. Myers; U.S. Pat. No. 1,268,467, Pressure Connection and Gage, issued to C. I. Jacobson and A. L. Fowler, June 4, 1918; U.S. Pat. No. 4,058,009, Arrangement for Monitoring Pneumatic Tire Inflation Pressure, issued to Etter-Felix on Nov. 15, 1977; U.S. Pat. No. 4,244,214, Visual Tire Valve, issued to William F. Curran on Jan. 13, 1981. Harris, U.S. Pat. No. 4,411,917, teaches a tire gauge wherein the pressure indicator is actuated through a series of gears; it appears to be more relevant to applicant's prior invention U.S. Pat. No. 4,793,177, described hereinabove than to the present invention. Myers, U.S. Pat. No. 1,136,901, teaches a rather complicated tire valve attachment mechanism in which the indicator is apparently actuated by a gearing arrangement that rides on a sliding, piston type device; it appears to be more relevant to applicant's prior invention, U.S. Pat. No. 4,793,177, described hereinabove. Jacobson, U.S. Pat. No. 1,268,467, depicts a complicated device that is not readily understandable but appears to be less relevant than Anderson, Badowski or Stealy. Etter-Felix, U.S. Pat. No. 4,058,009, teaches a device which is not readily substitutable for a tire valve stem, and does not appear to be as pertinent as Anderson, Badowski or Stealy. Curran, U.S. Pat. No. 4,244,214, teaches a tire valve for mounting over a valve stem and is therefore not a device designed to be incorporated within a valve stem. Curran includes a window which depicts one of three colored bands to indicate over-inflation, proper inflation and under-inflation. A calibrated spring which resists movement of an air flow control rod is utilized to control which color is shown in the window.

SUMMARY OF THE INVENTION

It is an object of the combination tire valve and pressure gauge of the present invention to provide a device which is substantially the same size as current tire valve stems and is usable as a replacement therefor.

It is another object of the present invention to provide a device which indicates the air pressure within a tire through a window formed in the device.

It is a further object of the present invention to provide a device having a minimal number of moving parts.

It is yet another object of the present invention to provide a device which indicates tire pressure utilizing numerals.

It is yet a further object of the present invention to provide a device utilizing a rotary indicator with dial numerals which provide high accuracy and readability.

The combination tire valve and pressure gauge of the present invention is formed to be substantially the same size as current tire valve stems, such that it may be used as a replacement part therefor. The device includes a pressure sensitive bellows disposed within the stem, the movement of which is counteracted by a calibrated spring. Movements of the bellows, caused by changes in the tire pressure, are mechanically translated to a rotary motion of a pressure indicator. A window is formed in the tire stem to permit viewing of the pressure indicator, whereby different numerals corresponding to different tire pressures become visible in the window upon rotation of the indicator which is caused by movement of the bellows. An air channel is formed through the device to permit air to be pumped into the tire. A rotary indicator having an internal spiral groove rotates upon a driving rod formed with projecting driving pin members that project into the spiral groove to cause the rotation of the indicator.

It is an advantage of the combination tire valve and pressure gauge of the present invention that it provides a device which is substantially the same size a current tire valve stems and is usable as a replacement therefor.

It is another advantage of the present invention that it provides a device which indicates the air pressure within a tire through a window formed in the device.

It is a further advantage of the present invention that it provides a device having a minimal number of moving parts.

It is yet another advantage of the present invention that it provides a device which indicates tire pressure utilizing numerals.

It is yet a further advantage of the present invention that it provides a device utilizing a rotary indicator with dial numerals which provide high accuracy and readability.

It is an object of the pencil type tire pressure gauge of the present invention to provide a device utilizing a rotary indicator with dial numerals which provide high accuracy and readability.

It is another object of the pencil type pressure gauge to provide a device having a push button type pressure control valve with a valve core in pneumatic communication with the tire valve stem.

It is a further object of the pencil type pressure gauge to provide a tire pressure reading that remains visible until the pressure control valve head is pushed.

The pressure gauge of the present invention can be inserted into a tubular housing instead of a valve stem. The resulting device is a pencil type tire pressure gauge. A clear plastic cap is formed on top of the tubular housing to permit viewing of the pressure indicator. Numerals indicating tire pressure are seen through the plastic cap. A pressure control valve with a valve core is formed in the other end of the tubular housing. The valve core opens in communication with air in the tire when the pressure control valve head is placed against a tire valve stem. Removing the pressure control valve head from the tire valve stem closes the valve core and seals in the tire pressure inside the tubular housing such that the rotary indicator is fixed for ease of reading. Pushing the pressure control valve head releases pressurized air from the tubular housing.

It is an advantage of the pencil type pressure gauge of the present invention that it provides a device utilizing a rotary indicator with dial numerals which provide high accuracy and readability.

It is another advantage of the pencil type pressure gauge of the present invention that it provides a device having a push button type pressure control valve with a valve core in pneumatic communication with the tire valve stem.

It is a further advantage of the pencil type pressure gauge that it provides a tire pressure reading that remains visible until the pressure control valve head is pushed.

The foregoing and other objects, features and advantages of the present invention will be apparent from the following detailed description of the preferred embodiments which make reference to the several figures of the drawing.

IN THE DRAWING

DETAILED DESCRIPTION OF THE PREFERRED EMBODIMENTS

Figure 1:
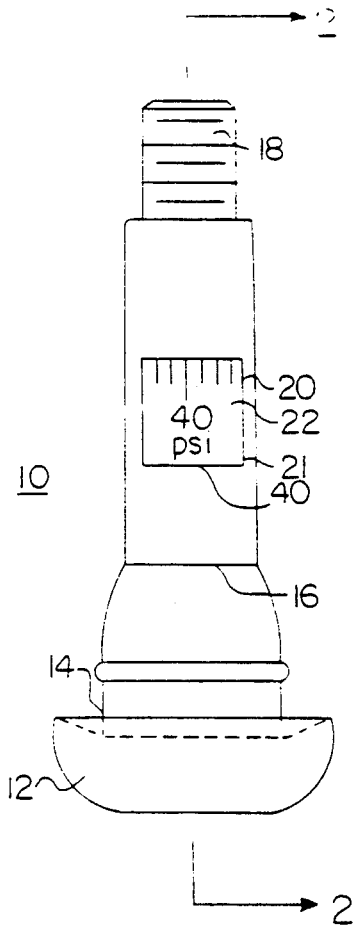
FIG. 1 is a side elevational view of the present invention.

As depicted in FIG. 1, the outward size and shape of the present invention is designed to be similar to the size and shape of currently available tire valve stems, such that the present invention may be used as a replacement part for existing tire valve stems. The combination tire valve and pressure gauge of the present invention 10, as depicted in FIG. 1, has an enlarged base 12 that is circular when viewed from below. A circumferentially disposed notch 14 is formed above the base and serves to form an airtight seal with the tire rim hole (not shown) into which the tire valve 10 is inserted for use. The upward portion 16 of the valve 10 is formed as a tapered cone which terminates in a projecting threaded nozzle portion 18, the outer threads 19 of which are utilized for the attachment of a cap (not shown). A cutout portion 21 is formed in the cone portion 16 of the valve 10 and a clear window 20 is engaged therein through which the user can view a pressure indicator 22 which serves to indicate the air pressure in the tire by means of an air pressure gauge mechanism of the present invention described hereinbelow.

Figure 2:
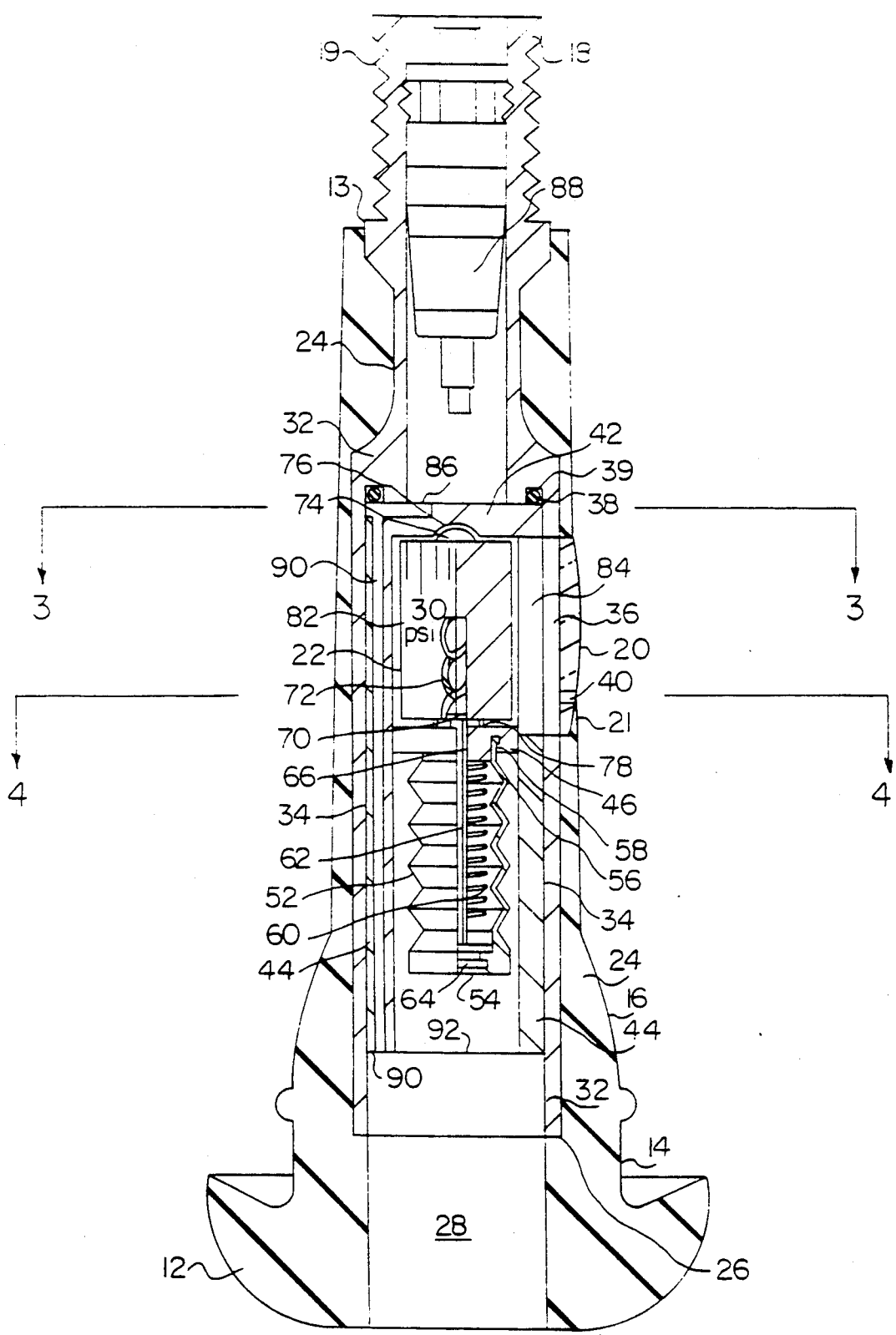
FIG. 2 is a side cross-sectional view of the present invention, taken along lines 2—2 of FIG. 1 and having cutaway portions.

FIG. 2 depicts a cross-sectional view of the valve 10, taken along lines 2—2 of FIG. 1, having cutaway portions to aid in the comprehension of the device. As depicted in FIG. 2, the projecting conical portion 16 of the valve 10 is formed with a hollow cylindrical cavity 24 defined by a bottom portion 26 having an air passage 28 formed therethrough to allow air to communicate through the valve 10 to the tire. The threaded nozzle portion 18 of the valve 10 is formed with a downwardly projecting hollow, cylindrically-shaped portion 31 which is defined by cylindrical walls 32, which walls 32 are sized to be tightly engaged in the hollow, cylindrical cavity 24 of the cone 16. The cylindrical walls 32 define a hollow cylindrical space 34 in which the pressure gauge components described hereinbelow reside. As is more fully described hereinafter, a cutout section 36 is formed in a portion of the cylindrical wall 32 in radial alignment with the cutout 21 formed in the cone 16 to permit the viewing of a pressure indicator 22 through window 20 formed in cone 16. The window 20 is formed from a visually transparent material, such as glass or preferably a clear plastic, and is sealingly engaged to the edges of the cutout 21, to prevent water or other foreign elements from entering the valve. It is preferable that the window 20 be shaped to magnify the numerals of the indicator 22 for ease of reading by the user. A small air passage hole 40 may be formed through the window seal at the edge of the window to permit air to pass into and out of the inner portion of the valve, such that equalization of air pressure within the valve components and the ambient may be maintained.

A pressure gauge assembly is disposed within the hollow cylindrically-shaped space 34 formed by the cylindrical walls 32. The gauge assembly includes a cylindrical housing having a cap 42 and cylindrical sidewalls 44, which are sized to engage the walls 32 in an airtight engagement.

An O-ring seal 38 is disposed in a circular notch 39 formed in the upper edge of cap 42 to facilitate the airtight engagement of the cap 42 and other pressure gauge assembly components with the cylindrical walls 32 of the nozzle portion 18 of the tire valve 10.

A support wall 46 is disposed substantially parallel to cap 42 and is engaged to the sidewalls 44 approximately mid-way through the length of the sidewalls 44 of the housing. The lower portion of the sidewalls 44 is not capped, such that air pressure from the air passage 28 through the base 12 of the device 10 communicates to the components of the gauge.

A generally cylindrical bellows 52 is disposed within the sidewalls 44. The bellows 52 is sealed at its lower end with a disk-shaped base 54 and joined to the support wall 46 at its upper end 56 in an airtight seal 58. Depending upon the material from which the bellows 52 is made, a calibrated coil spring 60, shown in the cutaway portion of the bellows 52 in FIG. 2, may be disposed within the bellows, such that one end of the coil spring 60 presses against the non-movable support wall 46 and the other end of the coil spring 60 presses against closed base 54 of the bellows 52. Where a calibrated spring is utilized, it is therefore to be realized that tire air pressure from the air passage 28 will tend to compress the bellows 52 upwardly and the calibrated coil spring 60 will tend to oppose the upwardly collapsing pressure on the bellows 52.

A calibrated coil spring 60 is necessary where the bellows 52 is composed of a material which does not possess natural resiliency. That is, if the bellows 52 is composed of a resilient material, such as a metal such as copper, no calibrated coil spring is necessary because the resiliency of the bellows will cause it to resist the air pressure forces imposed upon it. However, if the bellows is composed of a nonresilient material such as rubber, a calibrated coil spring 60 is necessary to provide the resilience to resist the air pressure forces.

A driving rod 62 is engageably disposed within the bellows 52 and parallel to the sidewalls 44 such that the distal end 64 of the rod 62 is engaged to the base 54 of the bellows 52. The rod 62 projects upwardly through the bellows 52 and through a hole 66 formed in the support wall 46.

The upper end of the driving rod 62 is formed with two projecting driving pins 70 which project laterally, outwardly from the upper end of the driving rod 62. The rotary indicator 22 has a central, axially disposed bore formed therein, and a spiral groove 72 is formed in the surface of the bore. The rotary indicator 22 is mounted upon the driving rod 62, such that the driving pins 70 of the driving rod 62 slidably reside within the spiral grooves 72 of the rotary indicator 22. It is therefore to be realized that the upward linear movement of the driving rod 62 will cause the rotation of the rotary indicator 22, due to the interaction of the driving pins 70 within the spiral groove 72. To facilitate the rotation and to maintain the alignment of the rotary indicator upon the driving rod 62, a small, hemispherical protrusion 74 is formed in the top of the rotary indicator 22. A hemispherical depression 76 is formed in the center of the cap 42 to slidably mate with the protrusion 74. Thus, the rotating movement of the protrusion 74 within the depression 76 aids in maintaining the rotational alignment of the rotary indicator 22 upon the driving rod 62. To further facilitate the rotation of the rotary indicator 22, a downwardly protruding neck 78 is formed in the rotary indicator 22 to reduce friction between the rotary indicator and the support wall 46. The rotary indicator 22 has a cylindrical sidewall 82 with pressure indicating numerals formed thereon, which is disposed for viewing through the window 20.

The sidewall 44 of the gauge is formed with a cutout portion 84 which is disposed in radial alignment with cutout 36 formed in wall 32, such that the numerals disposed on the pressure indicator 22 will be visible through the window 20.

It is therefore to be appreciated that increasing air pressure from the tire which causes the bellows 52 to collapse such that the base 54 of the bellows 52 moves upwardly, will cause the driving rod 62 and its projecting driving pins 70 to move upwardly. The straight-line motion of the rod 62 will cause the rotary pressure indicator 22 to rotate as a follower due to the engagement with the driving pins 70 within the spiral groove 72. Rotation of the pressure indicator 22 is viewable to the user through the window 20, such that pressure indicating numerals printed on the outer surface of the cylindrical wall 82 of the indicator 22 may be viewed.

Figure 3:
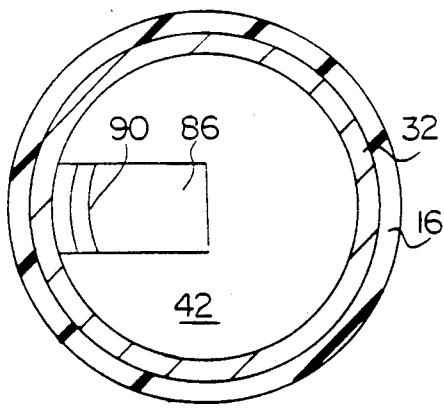
FIG. 3 is a cross-sectional top view of the present invention, taken along lines 3—3 of FIG. 2.
Figure 4:
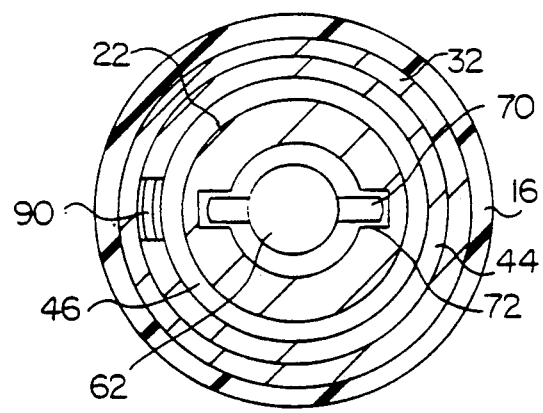
FIG. 4 is a cross-sectional view of the present invention, taken along lines 4—4 of FIG. 2.

As shown in FIGS. 2, 3 and 4, an air channel 90 is formed through a portion of the cylindrical wall 44 to permit air to be pumped into the tire. An air passage recess 86 is formed in the top surface of the cap 42 to permit air to pass from the standard tire valve core 88 disposed in the threaded nozzle 18 of the device 10. A lower portion 92 of the wall 44 is cut away proximate the lower end of the air passage 90 to permit air to pass therefrom into the air channel 28 formed through the base 12 of the valve 10. It is therefore to be realized that air may be pumped through tire valve core 88 through the cutaway portion 86 of the cap 42, through the air passage 90 formed in the wall 44, through the cutaway portion 92 formed in the lower portion of the wall 44 and into the air passage 28 formed in the base 12 of the valve 10 and thence into the tire.

The operation of the device, as described hereinabove, is facilitated by the axial alignment of the driving rod 62 and the small hemispherical projection 74 with the central axis of the cylindrical sidewalls 44, such that the rotary pressure indicator rotates freely and centrally within the sidewalls 44. The movement of the driving rod 62 is facilitated through a sliding engagement of the driving rod 62 within the hole 66 formed in the support wall 46. A tight, yet slidable engagement of the driving rod 62 within the hole 66 will tend to promote engagement of the driving pins 70 within the spiral groove 72, and proper operation of the device.

Figure 5:
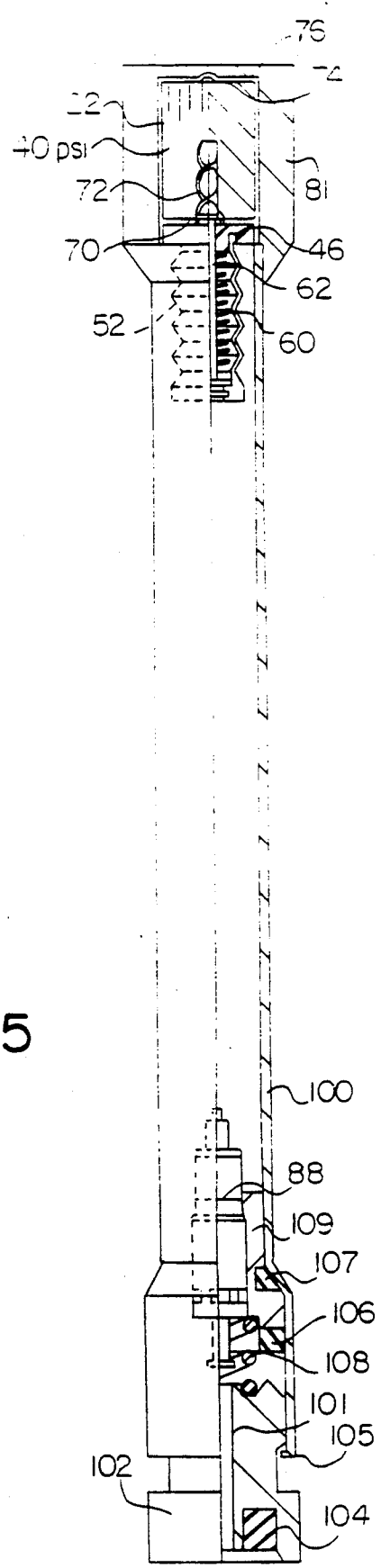
FIG. 5 is a side elevational view of a pencil type pressure gauge utilizing a rotary indicator, and having cutaway portions.

The pencil type pressure gauge with a control valve and rotary dial numerals is produced by inserting bellows 52, rod 62, spring 60, driving pin 70, indicator 22 and support wall 46 used in the previously disclosed valve stem into a pressure gauge tubular housing 100 shown in FIG. 5. A clear plastic cap 81 having depression 76 formed therein is engaged on the top of the tube 100. The user can view the pressure indicator 22 through the clear plastic cap 81. The indicator 22 is vertically stopped by the clear plastic cap 81 and the small hemispherical projection 74, and by the support wall 46 and the reduced diameter neck 78 of the indicator 22. The lower portion of the tube 100 is engaged to a push button type pressure control valve head 102 and a standard tire valve core 88. The pressure control valve head 102 is formed with an air passage bore 101 therethrough. A ring gasket 104 is inserted into the pressure control valve head 102 to prevent air leakage when the guage is pushed onto a tire valve stem. The pressure control valve head 102 slides axially, freely inside the tube 100, in that the movement of the pressure control valve head 102 is vertically stopped by a stop 105 at the end of tube 100 and by a second gasket 106 which prevents air from escaping from pressure control valve head 102 when communicating with a tire valve stem. The tire valve core 88 is screwed into a support cylinder wall 109, and an O-ring 107 attached to the support cylinder wall 109 is pressed fit into tube 100 to form an air tight seal. It is therefore to be realized that when pressure control valve head 102 is placed against a valve stem, the pressure control valve head 102 will move axially within tube 100 to push down upon the tire valve core 88. This causes tire valve core 88 to open and let pressurized air from the tire into the tube 100 through the air passage 101. A spring 108 is placed between the tire valve core 88 and the pressure control valve head 102 to quickly close access to the tire valve core 88 when the pressure gauge is removed from the valve stem. It is therefore to be realized that the tire valve core 88 will be closed as soon as the valve head 102 is released from the valve stem of the tire being measured. It is further to be realized that air pressure will increase inside the tube 100 to equal that of the tire being measured, which will cause the bellows 52 to move upwardly. This will cause the driving rod 62 and its projecting driving pins 70 to move upwardly. The straight-line motion of the rod 62 will cause the rotary pressure indicator 22 to rotate as a follower due to the engagement of the projecting driving pins 70 of the driving rod 62 within the spiral groove 72. The pressure indicating numerals printed on the dial of the pressure indicator 22 are viewable to the user through the clear plastic cap 81. These pressure measurements will remain until the pressure control valve head 102 is later pushed by the user to release the air inside the tube 100.

While the invention has been particularly shown and described with reference to certain preferred embodiments, it will be understood by those skilled in the art that various alterations and modifications in form and detail may be made therein. Accordingly, it is intended that the following claims cover all such alterations as fall within the true spirit and scope of the invention.

What is claimed is:

1. A combination tire valve and pressure gauge formed for disposition within a tire valve stem, comprising:

a housing being fixedly engaged within said tire valve stem;

a bellows being engaged within said housing and functioning to produce movement of a portion thereof upon exposure to changing tire air pressure, said bellows being in pneumatic communication with the air pressure within said tire; said bellows being substantially cylindrical in shape and formed for compressible movement along the central axis thereof, and wherein a calibrated spring is disposed within said bellows and operable to balance the movement of said bellows caused by said changing tire pressure;

a driving rod being formed with a first end and a second end, said first end of said driving rod being fixedly engaged to said bellows and said second end of said driving rod having a rotational engagement means formed thereon; said driving rod being slidably engaged within said housing, such that movement of said bellows results in axial movement of said driving rod along the linear axis thereof;

wherein said rotational engagement means includes driving pin members which project outwardly from said driving rod; said rotational engagement means also including a bore being axially disposed within a pressure indicator means, said bore having a spiral groove formed in the walls thereof, said driving pin members being slidably engaged within said spiral groove such that said axial movement of said driving rod will cause rotational movement of said pressure indicator means;

said pressure indicator means being rotatable within said housing and having numerals disposed thereon for indicating the air pressure within said tire; and a pressure indicator viewing means being formed through said tire stem and said housing proximate said pressure indicator means and operating to permit the visual inspection of said pressure indicator means whereby information related to the tire air pressure may be visually obtained.

2. A pencil type tire pressure gauge for determining the air pressure within a pneumatic tire, comprising:

a tubular housing, being hollow and having a first end and a second end;

a pressure gauge having a valve housing that is fixedly engaged and pneumatically sealed to said tubular housing proximate said first end;

a tire core valve being fixedly engaged and pneumatically sealed to said tubular housing proximate said second end thereof;

an air pressure sensitive means being engaged within said valve housing and functioning to produce movement of a portion thereof upon exposure to changing air pressure; said air pressure sensitive means being in pneumatic communication with the air pressure within said tubular housing;

a driving rod being engaged to said air pressure sensitive means and slidably engaged within said valve housing, such that movement of said air pressure sensitive means results in axial movement of said driving rod along the linear axis thereof;

a pressure indicator engagement means being engaged to said driving rod and operating to convert said axial movement of said driving rod into rotational movement of a pressure indicator means;

said pressure indicator means being engageably mounted on said driving rod and rotatable within said housing, said pressure indicator means having numerals disposed thereon for indicating the air pressure within said tubular housing; and a pressure indicator viewing means being engaged to said tubular housing proximate said pressure indicator means and operating to permit the visual inspection of said pressure indicator means whereby information related to the air pressure may be visually obtained.

3. A device as described in claim 2 wherein said air pressure sensitive means includes a bellows being substantially cylindrical in shape and formed for collapsible movement along the central axis thereof, and wherein a calibrated spring is disposed within said bellows and operable to resist the movement of said bellows.

4. A device as described in claim 3 wherein said driving rod is formed with a first end and a second end, said first end of said driving rod being fixedly engaged to said bellows and said second end of said driving rod having a rotational engagement means formed thereon; and wherein said rotational engagement means includes driving pin members which project outwardly from said driving rod; said rotational engagement means also including a bore being axially disposed within said pressure indicator means, said bore having a spiral groove formed in the walls thereof, said driving pin members being slidably engaged within said spiral groove such that axial movement of said driving rod will cause rotational movement of said pressure indicator means.

5. A device as described in claim 2 wherein an air pressure control means is engaged to said tubular housing to release greater than ambient air pressure within said tubular housing.

6. The device as described in claim 5 wherein said air pressure control means includes a push button valve member being slidably engaged within said tubular housing proximate said second end thereof; said valve member having an air channel formed therethrough and being disposed proximate said air valve core, whereby slidable movement of said valve member will cause depression of said tire valve core, such that excess air pressure within said tubular housing will be released.

* * * * *